Nov. 5, 1957　　　C. M. MUGLER　　　2,812,041
ROLLER BRAKE
Filed Aug. 10, 1953
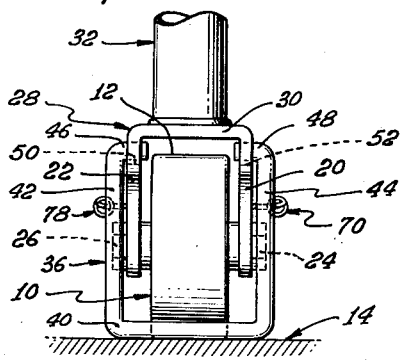
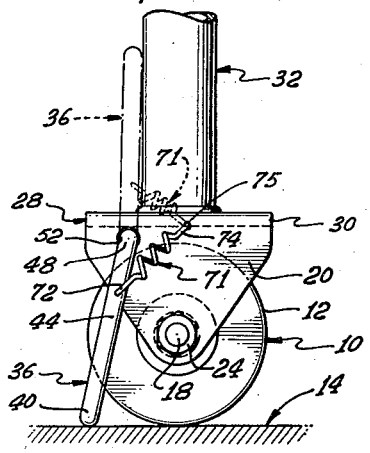
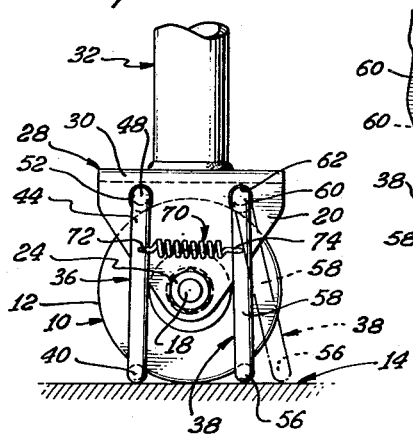
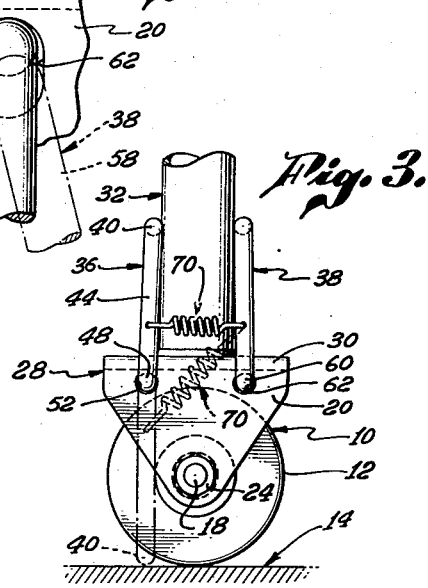
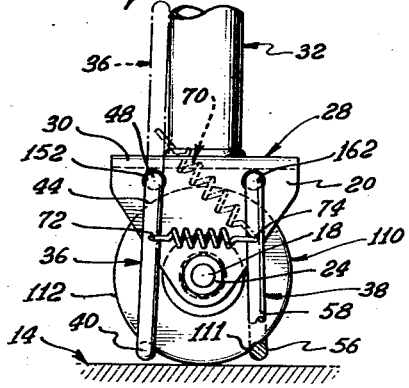
INVENTOR.
CHARLES M. MUGLER,
BY
ATTORNEY.

United States Patent Office 2,812,041
Patented Nov. 5, 1957

2,812,041
ROLLER BRAKE

Charles M. Mugler, North Hollywood, Calif., assignor to Rol-Fol Table, Inc., Los Angeles, Calif., a corporation of California Application August 10, 1953, Serial No. 373,418

3 Claims. (Cl. 188—74)

This invention relates generally to means for selectively preventing movement of roller-mounted articles, such as furniture or the like, and more particularly discloses a brakeable support roller or caster including brake means which may be selectively positioned to prevent rotation of the roller in one or both directions, or, alternatively, to allow free rotation of the roller or caster.

It is well known that many pieces of furniture and other articles are provided with small floor-engaging rotatable wheels for convenience in moving the articles so equipped to desired locations. Such small wheels may take the form of rollers mounted for rotation about horizontal axes fixed relative to the supported article, or they may be in the form of casters rotatable about a horizontal axis which, in turn, is swivelable relative to the supported article. It is often desirable to insure that articles of furniture or other things equipped with rollers stay in a selected position once placed there. The present invention provides selectively operable brake means for accomplishing this objective.

There are two principal embodiments of the invention hereinafter shown and described. One such embodiment is applicable in the case of rollers or casters made of hard, substantially rigid material, for example, metal or plastic having a rigidity and hardness comparable to that of metal. The other embodiment of the invention is chiefly applicable when used with a roller or caster made of somewhat yieldable material, such as "hard" rubber or the like. In common, however, the two embodiments of the invention include brake means pivotally mounted upon a horizontal axis displaced from the axis of rotation of the roller or caster, the brake means being provided with a horizontally disposed braking foot which is selectively contactable with the floor-engaging surface of the roller or caster with which used. The construction is such that a selected braking foot may be easily removed from roller-contacting position and retained in such inoperative position to permit free rolling of the rotatable wheel. Moreover, in the preferred embodiment of the invention, the brake means include a pair of individually movable members each provided with a braking foot, the two braking feet being operable to prevent rotational movement of the wheel in either direction.

For most satisfactory operation, the horizontal axis around which the brake means are pivotable is so disposed that the plane joining such axis and the braking foot is angularly disposed upwardly from a plane passing through the braking foot and disposed radially of the rotatable wheel.

It is a principal object of the present invention, therefore, to disclose novel and useful braking means for use in connection with a rotatable floor-engaging support wheel.

Another object of the invention is to disclose a construction of the class described including a braking member pivotally rotatable about a horizontally disposed axis and including a horizontal braking foot selectively contactable with the floor-engaging surface of a support wheel.

A further object of the invention is to disclose selectively positionable braking means for use in connection with support wheels wherein such braking means are pivotally connected to supporting members by a relatively loose or sloppy fit.

Yet another object of the invention is to disclose apparatus of the character above referred to including resilient retaining means for yieldably holding the braking member in either operative or inoperative position.

A further object of the invention is to provide braking means for support wheels adapted to, selectively, brake the wheel against rotation in one or both directions.

A further object of the invention is to disclose braking means having the above advantageous characteristics which may be conveniently and economically used in connection with existing, conventional support wheels.

These and allied objects and purposes of the invention will become clear from the following description of preferred embodiments of the invention taken in connection with the accompanying drawings, in which:

Fig. 1 is an end elevational view of a support wheel and mounting including a fragmentary portion of a support leg, showing a typical application of the present invention; both braking members are in operative position.

Fig. 2 is a side elevational view of the device of Fig. 1, taken from the right as seen in Fig. 1, one braking member being shown in dotted outline just before arrival in operative position.

Fig. 3 is a side elevational view similar to Fig. 2 except that both braking members are in inoperative position; one braking member is shown in dotted outline in operative position.

Fig. 4 is a side elevational view of a form of the invention useable in connection with support rollers or casters which are somewhat resilient; one braking member is shown in inoperative position in dotted outline and the braking foot of the other braking member is shown in section.

Fig. 5 is a side elevational view of brake means in accordance with the present invention including only a single braking member, the member being shown in full lines just prior to arrival in braking position and in dotted outline in inoperative position.

Fig. 6 is a fragmentary view on an enlarged scale of the pivotal connection of a braking member as seen in Fig. 2.

Referring now in detail to Figs. 1, 2, 3 and 6 of the drawing, a rotatable support wheel in the form of a roller is indicated generally at 10 and includes a substantially cylindrical, floor-engaging surface 12 in contact with a horizontal surface, such as floor 14. Roller 10 is suitably mounted for rotation about a horizontally disposed shaft 18 supported at either end in downwardly depending skirt members 20 and 22. Desirably the ends of the shaft 18 may be threaded and carry thereon suitable conventional nuts 24 and 26 to retain the shaft 18 in position relative to the skirts 20 and 22.

Skirts 20 and 22 are in reality downwardly extending arms of a U-shaped support mounting or saddle indicated generally at 28 and including a horizontally disposed yoke portion 30 extending between the skirt members 20 and 22. Desirably, but not necessarily, the component parts of saddle 28 are integrally formed, the skirt members 20 and 22 and the horizontal yoke portion 30 being all portions of a single piece of strap material, such as metal plate or the like.

A support leg indicated generally at 32 is fixed to the upper surface of the yoke portion 30 and extends upwardly therefrom to the article of furniture or similar thing being supported (not shown). As will be readily understood as the description of the present invention progresses, the support leg 32 need not necessarily be fixed relative to the axis of shaft 18 as shown in the present illustrative embodiment of the invention. Thus, the attachment between support leg 32 and the mounting member or saddle 28 may be swivelable, as in a conventional caster, whereby the axis of shaft 18 is displaced away from vertical alignment with the support leg 32.

A pair of braking means is provided in the embodiment of the invention shown in Figs. 1, 2, 3 and 6, such braking means being adapted to selectively brake the rotation of support wheel 10 in one or both directions of rotation or, alternatively, to be rendered inoperable, whereby the support wheel 10 will rotate freely upon the floor 14. The pair of braking means are indicated generally at 36 and 38, respectively. Braking member 36 is generally U-shaped and may be desirably made of a single piece of wire rod or the like. The braking member 36 includes a horizontally disposed braking foot portion 40 having at each end an arm 42 and 44, the arms being mutually parallel and perpendicular to the braking foot portion 40. The braking member 36 is pivotally mounted relative to the support saddle 28 for rotation about a horizontal axis. Desirably, such pivotal mounting is accomplished by inturned portions 46 and 48 at the ends of arms 42 and 44, respectively, the inturned portions 46 and 48 being rotatably journaled in suitable openings 50 and 52 formed in the skirt members 22 and 20, respectively. As will be later described in connection with Fig. 6, the size of openings 50 and 52 is somewhat larger than the size of the inturned end portions 46 and 48 of the braking member 36, so that the rotatable fit is loose or sloppy.

The other braking member 38 of the pair shown in Figs. 1, 2 and 3 is substantially identical in construction with the braking member 36 already described. Moreover, the two braking members 36 and 38 are symmetrically disposed relative to the axis of shaft 18, the braking member 38 including a braking foot portion 56 and an upwardly extending arm 58 terminating in an inturned portion 60 loosely journaled in opening 62 formed in skirt 20.

Reference to Fig. 3 and comparison thereof with Fig. 2 will demonstrate the alternative positions which may be assumed by the braking members 36 and 38. In Fig. 3, in solid lines, the two braking members are shown in their upper or inoperative positions, while in Figs. 1 and 2 the same braking members are shown in their lower braking or operative positions. Resilient means are provided for retaining the braking members 36 and 38 in either of their positions. Such means, in the present illustration, include longitudinally extending spring means indicated generally at 70 and suitably attached at either end 72 or 74 to arms 44 and 58 of the braking members 36 and 38, respectively. It will be especially noted that the points of attachment of the ends 72 and 74 of the spring means 70 with the respective arms are displaced from the horizontal axes of rotation of the two braking members 36 and 38. As a result of this displacement, the parts operate as a toggle or over-center device in retaining the braking members 36 and 38 in either their upper, inoperative positions as shown in Fig. 3, or their lower, operative positions shown in Figs. 1 and 2. As will be readily understood, a second resilient means, indicated generally at 78 (see Fig. 1), may be provided and if used, extends between and is attached to the arms of the braking members 36 and 38 substantially parallel to the spring 70 heretofore described. Moreover, with special reference to Fig. 3, it will be seen that one braking member only, as 36, may be positioned in its lower, braking or operative position, while the other braking member 38 is in its upper or inoperative position. The resilient means 70 serve to retain the braking members in those positions.

The operation of the braking members 36 or 38 in preventing rotation of wheel 10 is thought to be substantially self-evident from consideration of the description heretofore set forth, taken in connection with the figures referred to. Actual braking of the support wheel 10 is effected by wedging engagement of one of the braking foot portions 40 or 56 between the floor-engaging surface 12 and the floor proper 14. The desirability of the sloppy or loose fit of the brake member will now be appreciated. With special reference to braking member 38 as is shown in Fig. 2, it will be seen that the length of the arm 58 of braking member 38, as compared with the vertical height of opening 62 above the floor, is such that the horizontal braking foot portion 56 of the braking member 38 strikes the floor 13 a short distance away from wedging engagement between the floor and the floor-engaging surface 12 of the wheel 10. Such position of the braking member 38 is shown in dotted outline in Fig. 2, and the braking member assumes such position during movement into eventual braking position shown in solid lines in Fig. 2.

Reference to the enlarged view appearing in Fig. 6 will clarify the pivotal connection between the upper end of arm 58 and the opening 62 formed in skirt 20. When braking member 38 is in its intermediate position, as shown in dotted outline in Fig. 2, the inturned end portion 60 of arm 58 is in the lower portion of the enlarged opening 62. As soon, however, as wheel 10 rotates slightly rightward, as seen in the figures, the braking member 38 moves into the position shown in solid lines in Fig. 2, the upper end portion 60 of arm 58 moving upwardly in opening 62 to the position shown in solid line in Fig. 6. Athough the inturned end portion 60 is shown as in actual abutting contact with the upper edge of opening 62, it will be readily understood that such contact is not necessary for proper functioning of the device. The important aspect is that the horizontally disposed braking foot portion 56 be moved into wedging engagement between the floor 14 and the floor-engaging surface 12 of the wheel.

Movement of the braking members 36 or 38 to and from their operative positions is easily accomplished either manually or using the toe of one's shoe, and each of the braking members will be retained in the position to which moved by reason of the over-center action of the resilient spring means 70.

When it is desired to provide braking against movement in only one direction, the device shown in Fig. 5 may be employed. As there shown, a single braking member 36 identical to the braking member 36 heretofore described in Figs. 1, 2 and 3, is pivotally connected to skirt 20 for rotation about a horizontally disposed axis. Resilient spring means, indicated generally at 71, are attached at one end 72 to the arms 44 as before. The other end 74 of the spring means 71 is rotatably fastened to the skirt 20 at 75. As before, the spring means 71, together with the pivotal braking member 36, constitutes an over-center toggle device by which to retain the braking member 36 in either its lower position or upper position. The braking member 36 in Fig. 5 is shown in solid lines in the intermediate position corresponding to the position of braking member 38 shown in dotted outline in Fig. 2. It will be understood that a slight leftward movement of the wheel 10 from the position shown in Fig. 5 will cause the horizontal foot portion 40 of braking member 36 to wedgingly engage itself between the floor 14 and the floor-engaging surface 12 of the wheel. Thus the structure of Fig. 5 is, in effect, a sort of a one-way clutch. Movement rightwardly is completely unimpeded; movement leftwardly is prevented by reason of the braking effect of the horizontal braking foot 40.

In Fig. 4 is shown a slightly modified form of construction for practicing the present invention in connection with a wheel, indicated generally at 110, made of a material having some degree of resiliency. The structure of Fig. 4 is similar in major aspects to the structure heretofore described in connection with Figs. 1, 2 and 3, with the exception that it is not necessary that the pivotally connected braking members 36 and 38 be loosely or sloppily journaled to the downwardly depending skirts of saddle 28. Thus, the openings 152 and 162 formed in skirt 20 may be substantially the same size as that of the inturned end portions of arms 44 and 58, respectively, allowing only sufficient clearance for rotation of the pins in the openings. Aside from this, the principal difference appearing in the structure of Fig. 4 is that the horizontally disposed braking foot portions 40 and 56 are arranged to contact the floor-engaging surface 112 of wheel 110 somewhat above the level of floor 14. Thus, the braking foot portions 40 and 56 do not necessarily come into contact with floor 14 at any time during operation. Instead, braking effect is accomplished by the braking foot portions 40 or 56 by reason of slight indentations into the body of wheel 110 caused by the horizontal foot portions. With particular reference to the braking foot portion 56 seen in section in Fig. 4, it will be seen that the foot portion 56 has caused a slight indentation 111 in the wheel 110. It will be seen that the horizontal braking foot 56 prevents rotation of wheel 110 in a clockwise or rightward direction as seen in Fig. 4, whereas braking foot 40 of the wheel 110 prevents rotation in counterclockwise or leftward direction, as seen in the figure. The braking effect of the braking members is enhanced if the wheel 110 is made of a material having a floor-engaging surface 112 of appreciable friction, such as in the case of rubber or a rubber substitute. As in the case of the braking members previously described, either or both of the braking members 36 or 38 may be rotated upwardly to inoperative position, as illustrated specifically in the case of braking member 36 as shown in dotted outline in Fig. 4.

Accordingly it will be seen that I have provided an inexpensive and easily operable brake means which may be used in connection with conventional support rollers or casters customarily used with furniture or the like. It is to be understood that the specific forms of the invention herein shown and described are illustrative only of means by which the invention may be practiced, and certain departures may be made from these specific forms without impairing in any substantial way the operability of the invention. For example, the exact shape of the enlarged openings 52 and 62 formed in the skirt 20 (and their counterparts formed in skirt 22) is not critical so long as such shape permits a certain amount of movement of the respective inturned end portions of the arms of the braking members. It is highly desirable, however, that in any construction embodying the invention the line joining the horizontal braking foot and the axis of pivotal rotation of the braking member be angularly spaced from a radial line of the wheel intersecting the braking foot when in operative or braking position. I prefer that such angular spacing be such that the axis of pivotal rotation of the braking member be above the radial line or plane of the support wheel intersecting the braking foot, as shown throughout the illustrative embodiments of the invention.

Changes and modifications from the specific forms herein shown, in addition to those particularly mentioned above, will occur to those skilled in the art. All such modifications and changes not departing from the spirit of the invention are intended to be embraced within the scope of the appended claims.

I claim:

1. A roller brake for use with a support roller having a floor-engaging surface adapted to roll upon a horizontal support surface and rotatably connected to a support mounting for rotation about a horizontal axis comprising: a brake member having at least one arm portion pivotally attached to the support mounting for swinging movement through an angle of substantially 180° in a substantially vertical plane between upper, inoperative and lower, operative positions, and a horizontally disposed portion fixed to the distal end of the arm portion and contactable with said floor-engaging surface when in operative position; a second brake member having at least one arm portion pivotally attached to the support mounting above said axis for swinging movement through an angle of substantially 180° in a substantially vertical plane between upper, inoperative and lower operative positions, and a horizontally disposed portion fixed to the distal end of said last named arm portion and contactable with said floor-engaging surface when in operative position, the said horizontally disposed portions being on opposite sides of the vertical plane passing through said axis and said arms being on the same side of said roller; and resilient means connected at each of its ends to said arms at points intermediate the ends of the arms for urging said horizontally disposed portions toward the vertical plane passing through said axis and by toggle action into, selectively, operative or inoperative positions.

2. The invention as stated in claim 1 wherein said arms are shorter in length than the height of their pivotal attachment above the horizontal support surface.

3. The invention as stated in claim 1 wherein elongated slots are formed in the support mounting and said arms pivotally engage said slots, and said arms are at least slightly greater in length than the minimum height of the respective slots above the horizontal support surface whereby said horizontally disposed portion contacts the support surface when in operative position.

References Cited in the file of this patent

UNITED STATES PATENTS

| | | |
|---|---|---|
| 535,033 | Velen | Mar. 5, 1895 |
| 560,457 | York et al. | May 19, 1896 |
| 711,402 | Keyes | Oct. 14, 1902 |
| 1,101,883 | Rochford | June 30, 1914 |
| 1,733,536 | Guitschula | Oct. 29, 1929 |
| 1,785,421 | Nielsen | Dec. 16, 1930 |
| 1,942,825 | Meunier | Jan. 9, 1934 |
| 1,998,236 | Herold | Apr. 16, 1935 |
| 2,096,229 | Dudley | Oct. 19, 1937 |
| 2,147,064 | Schultz | Feb. 14, 1939 |
| 2,560,704 | Sebel | July 17, 1951 |